(12) United States Patent
Allen et al.

(10) Patent No.: US 10,983,695 B2
(45) Date of Patent: Apr. 20, 2021

(54) FOCUS MANAGEMENT SYSTEM

(75) Inventors: Sean D. Allen, Half Moon Bay, CA (US); J. Peter Hoddie, Menlo Park, CA (US)

(73) Assignees: Kinoma, Inc., Palo Alto, CA (US); Sony Corporation, Tokyo (JP)

( * ) Notice: Subject to any disclaimer, the term of this patent is extended or adjusted under 35 U.S.C. 154(b) by 2703 days.

(21) Appl. No.: 11/258,247

(22) Filed: Oct. 24, 2005

(65) Prior Publication Data

US 2007/0092243 A1 Apr. 26, 2007

(51) Int. Cl.
*G09G 5/08* (2006.01)
*G06F 3/0489* (2013.01)
*G06F 3/0482* (2013.01)

(52) U.S. Cl.
CPC ........ *G06F 3/04892* (2013.01); *G06F 3/0482* (2013.01)

(58) Field of Classification Search
USPC ........ 345/156, 160, 173; 715/767, 802, 812, 715/829, 853–854, 862
See application file for complete search history.

(56) References Cited

U.S. PATENT DOCUMENTS

| | | | | |
|---|---|---|---|---|
| 5,333,254 A * | 7/1994 | Robertson | ............... | G06F 16/94 715/853 |
| 5,673,401 A * | 9/1997 | Volk | .................... | G06F 3/04847 348/E5.103 |
| 5,848,402 A * | 12/1998 | Pao | ........................ | G06N 3/126 706/13 |
| 6,614,457 B1 * | 9/2003 | Sanada et al. | ................ | 715/840 |
| 6,965,390 B2 * | 11/2005 | Alimpich et al. | ............ | 715/781 |
| 7,086,042 B2 * | 8/2006 | Abe | ........................ | G06F 40/14 717/143 |
| 7,526,726 B1 * | 4/2009 | Skwarecki | ........... | G11B 27/034 715/730 |
| 7,836,427 B1 * | 11/2010 | Li | ............................. | G06F 8/20 717/117 |
| 8,185,549 B1 * | 5/2012 | McDade | ............... | G06F 16/954 707/782 |
| 2002/0070961 A1 * | 6/2002 | Xu | ...................... | G06F 3/04892 715/738 |
| 2003/0052919 A1 * | 3/2003 | Tlaskal | ................... | G06F 9/451 715/764 |

(Continued)

*Primary Examiner* — Carolyn R Edwards
(74) *Attorney, Agent, or Firm* — Procopio, Cory, Hargreaves & Savitch LLP

(57) ABSTRACT

A method for managing focus in a graphical user interface using a directional controller that allows a directional or selection input. The method comprising: determining whether the input is directional or selection; determining whether there is a sibling object of a currently focused object in a given direction of the input if the input is directional; transferring the focus to the sibling object if there is a sibling object in the given direction; transferring the focus to an ancestor object of the currently focused object if there is no sibling object in the given direction; determining whether the currently focused object is a group; transferring the focus to a descendant object of the currently focused object if the currently focused object is a group and the input is selection; and selecting the currently focused object if the currently focused object is not a group and the input is selection.

10 Claims, 9 Drawing Sheets

(56) References Cited

U.S. PATENT DOCUMENTS

| | | | |
|---|---|---|---|
| 2003/0056024 A1* | 3/2003 | Tlaskal | G06F 9/542 |
| | | | 719/315 |
| 2004/0003348 A1* | 1/2004 | Ostertag et al. | 715/514 |
| 2004/0090463 A1* | 5/2004 | Celik | G06F 3/0481 |
| | | | 715/767 |
| 2004/0189827 A1* | 9/2004 | Kim | G11B 27/329 |
| | | | 348/231.4 |
| 2005/0228640 A1* | 10/2005 | Aue et al. | 704/9 |
| 2006/0085435 A1* | 4/2006 | Farn | G06F 16/9027 |
| 2006/0150169 A1* | 7/2006 | Cook | G06F 8/10 |
| | | | 717/156 |
| 2007/0038961 A1* | 2/2007 | Robbins | G06F 16/168 |
| | | | 715/853 |

* cited by examiner

FOCUS MANAGEMENT SYSTEM

BACKGROUND

In a typical window-based graphical user interface (GUI), a group of visually distinct display objects are provided on the display screen. The GUI objects include objects that are visual images such as text and/or a picture. More specifically, the GUI objects include a button, a list box, a check box, a menu bar, and other related objects such as an "icon". The GUI objects provide certain information to the user and allow selection by the user.

A focus displayed on a GUI display screen allows the user to point at a given GUI object on the screen using input units such as a keyboard, a remote controller of a television, a controller of a game console, or a keypad for a PDA. The focus is a visual indication showing an area on a GUI screen currently referenced by the user and is represented, for example, by a shaded box enclosing the currently referenced GUI object. Such a focus is necessary when the user uses an input unit such as a keyboard, a group of directional buttons, or a keypad, unlike a pointing device such as a mouse, and cannot directly point at a given area on the GUI display screen.

A GUI screen control system controls the focus so that the focus moves from one area to another on the GUI screen in response to operations of a button or a key indicating a direction such as up, down, right, or left on a controller or a keypad. When the user presses a button or a key indicating confirmation, the GUI screen control system recognizes a focused GUI object as having been selected by the user and controls the processing according to the properties of the selected GUI object.

However, the need exists for a technique to design an efficient focus management system for a GUI screen that is controlled by input units such as a keyboard, a controller, or a keypad.

SUMMARY

The present invention provides method, apparatus, graphical user interface, and computer program for managing focus in a graphical user interface using a directional controller that allows a directional or selection input. In one implementation, the method comprises: determining whether the input is directional or selection; determining whether there is a sibling object of a currently focused object in a given direction of the input if the input is directional; transferring the focus to the sibling object if there is a sibling object in the given direction; transferring the focus to an ancestor object of the currently focused object if there is no sibling object in the given direction; determining whether the currently focused object is a group; transferring the focus to a descendant object of the currently focused object if the currently focused object is a group and the input is selection; and selecting the currently focused object if the currently focused object is not a group and the input is selection.

In another implementation, a graphical user interface (GUI) accessible to a user and suitable for receiving a user-supplied movement direction or selection input through a directional controller to manage focus comprises: a plurality of objects configured in a hierarchical structure allowing transfer of the focus from a currently focused object to a sibling object, ancestor object, or descendant object corresponding to the user-supplied movement direction or selection input; a first focus transfer element configured to transfer the focus from the currently focused object when the user supplied movement direction is received from the directional controller, the first focus transfer element operating to transfer the focus to the sibling object if there is a sibling object in the user-supplied movement direction, and to transfer the focus to the ancestor object if there is no sibling object in the user-supplied movement direction; and a second focus transfer element configured to transfer the focus from the currently focused object when the selection input is received from the directional controller, the second focus transfer element operating to transfer the focus to the descendant object if the currently focused object is a group, and to select the currently focused object if the currently focused object is not a group.

In another implementation, a computer program, stored in a tangible storage medium, for managing focus in a graphical user interface, the program comprises executable instructions that cause a computer to: determine whether the input is directional or selection; determine whether there is a sibling object of a currently focused object in a given direction of the input if the input is directional; transfer the focus to the sibling object if there is a sibling object in the given direction; transfer the focus to an ancestor object of the currently focused object if there is no sibling object in the given direction; determine whether the currently focused object is a group; transfer the focus to a descendant object of the currently focused object if the currently focused object is a group and the input is selection; and select the currently focused object if the currently focused object is not a group and the input is selection.

DETAILED DESCRIPTION

The present invention provides methods, graphical interfaces, computer programs, and apparatus for managing focus of objects in a graphical user interface.

Several illustrative examples of implementations are presented below. These examples are not exhaustive and additional examples and variations are also described later.

In one example, a personal digital assistant (PDA) 100 provides a graphical user interface (GUI) supporting animated focus management. In animated focus management, a user causes a selection indicator to move among objects displayed in the user interface. In other examples, any electronic device requiring graphical user interface, such as a portable phone, a camera, a television, a computer, can be configured with the animated focus management system of the present invention.

Figure 1:
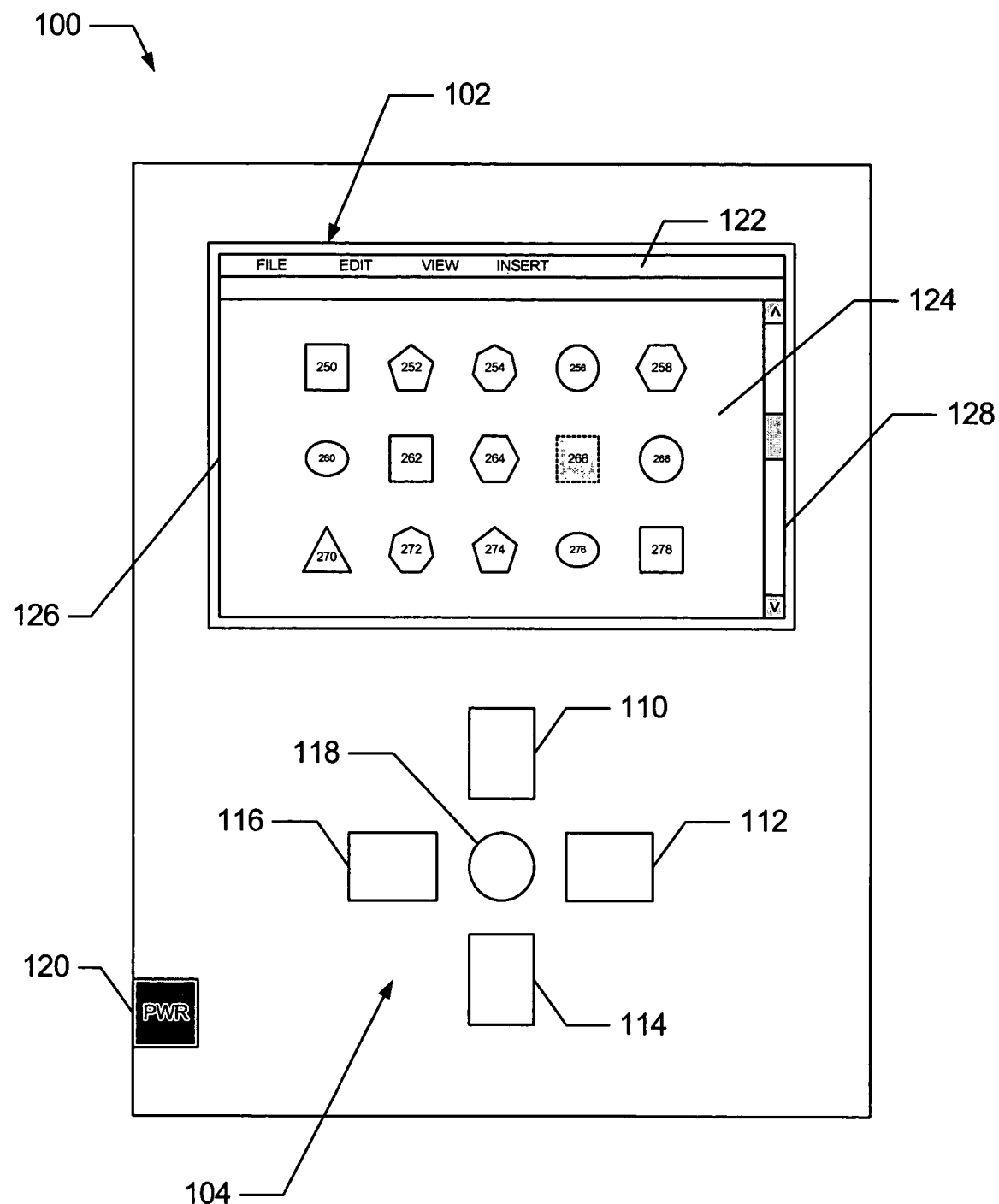
FIG. 1 illustrates a focus management system implemented in a personal digital assistant (PDA).

In FIG. 1, the PDA 100 has a display 102 (e.g., an LCD screen) and five input buttons 110, 112, 114, 116, 118. Additional buttons and controls can also be provided. The five input buttons are four directional buttons (up 110, down 114, left 116, right 112) and a select button 118. The four directional buttons 110, 112, 114, 116 are arranged in a cross pattern with the select button 118 in the center. A user activates the PDA 100 using a power button 120. The PDA 100 displays an initial or default screen 126 including a menu bar 122, an icon area 124, and a scroll bar 128.

Figure 2:
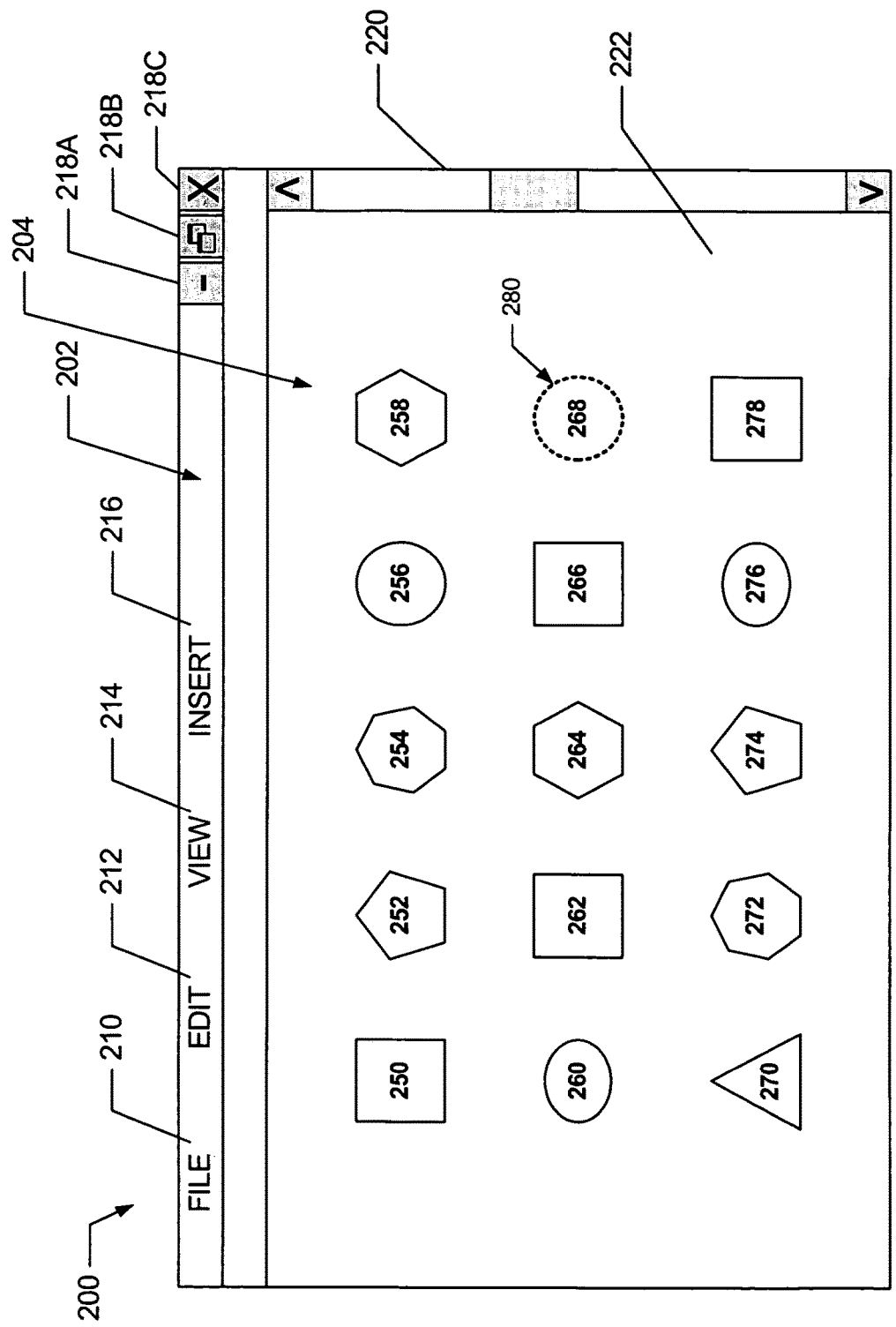
FIG. 2 illustrates one example of a focus management system implemented on a GUI display screen, which includes a menu bar, an icon area, and a scroll bar.

FIG. 2 illustrates one example of a focus management system implemented on a window application (GUI) display screen 200, which includes a menu bar group 202, an icon area group 222, and a scroll bar group 220. Various other GUI objects can also be displayed in other screens.

In the illustrated example, the menu bar group 202 includes four menu titles 210, 212, 214, 216 (i.e., menu groups) and window resizing buttons 218 (i.e., menu controls), which includes a minimize button 218A, a restore button 218B, and a window close button 218C. The icon area group 222 displays a collection of icon objects 250, 252, 254, 256, 258, 260, 262, 264, 266, 268, 270, 272, 274, 276, 278, each of which may be a group or control, arranged in rows and columns. The icon objects represent different operations, application programs, folders, and/or other related objects.

In the illustrated example, one 268 of the icon objects is highlighted with an animated ring 280. The ring 280 surrounds the icon object 268, conforming to the edges of the icon, and is visually animated (e.g., changes color or simulates dots moving around the selected icon).

In other examples, the animation includes any shapes and illustrations. For example, the animation may illustrate the transfer of focus so that the animation occurs when going up/down/left/right as well as in/out. Thus, if the user changes the new target before the animation completes, the animation smoothly curves towards the new target.

The user selects another icon object using the directional buttons 110, 112, 114, 116, causing the ring to move from one icon object to another icon object to indicate which icon object is selected or has "focus". The user selects one of the up/down/left/right buttons based upon the spatial relationship of the currently focused icon, and the desired target icon, so that if the desired target icon is to the left, the user selects the left button. Thus, the animation, in this case, illustrates the changing of the focus from icon to icon. In some implementations, icon objects may refuse to accept the "focus" so that moving the directional buttons will skip over those icon objects.

In general, a window application, such as a window 204, may include any number of objects including groups and/or controls. Examples of controls include a text field, a button, and a slider. Examples of groups include spatial containers, such as a folder, that may further include more groups and controls. As mentioned above, this results in a tree hierarchy with a window application at the root and nodes being objects. Thus, leaf nodes are controls and non-leaf nodes are groups. The concept of a tree hierarchy is described in general in FIG. 7, and specifically in FIG. 8 corresponding to designators in FIGS. 2 and 6.

Within a particular window application, only a single object can be the current focus target. When the focus is transferred to another object, the focus highlight animates to the next object. As described above, the user may use the directional buttons to change the focus target intuitively to an object that is in the specified direction.

To execute an operation or application program tied to a specific object, the user selects the corresponding object by moving the ring to that object and then pressing the select button 118. In response, the PDA 100 performs the requested operation or initiates the indicated application program, which may cause a different screen or window to be displayed.

To access the menu groups 210, 212, 214, 216 from the icon area group 222, the user moves the ring to an icon object in the top row 250, 252, 254, 256, or 258 and then presses the up directional button 110. In this operation, the ring moves from the selected icon object 250, 252, 254, 256, or 258 to the icon area group 222, and highlights the icon area group 222. The user then presses the up directional button 110 again to move the ring to the menu bar group 202, which highlights the menu bar group 202. When the user presses the select button 118, the focus is transferred from the currently focused object (i.e., the menu bar group 202) into a child object (i.e., any one of the menu groups 210, 212, 214, 216 and the menu controls 218) of the currently focused object. In one example, the focus (e.g., the animated ring) can be transferred to a first child object (e.g., the leftmost menu group 210).

The user selects among the objects 210, 212, 214, 216, 218 in the menu bar group by moving the ring from one menu object to another using the left and right directional buttons 112, 116 since the menus are horizontally arranged. However, in other implementations, the menu objects can be arranged in any direction, such as in vertical or diagonal direction.

Figure 3:
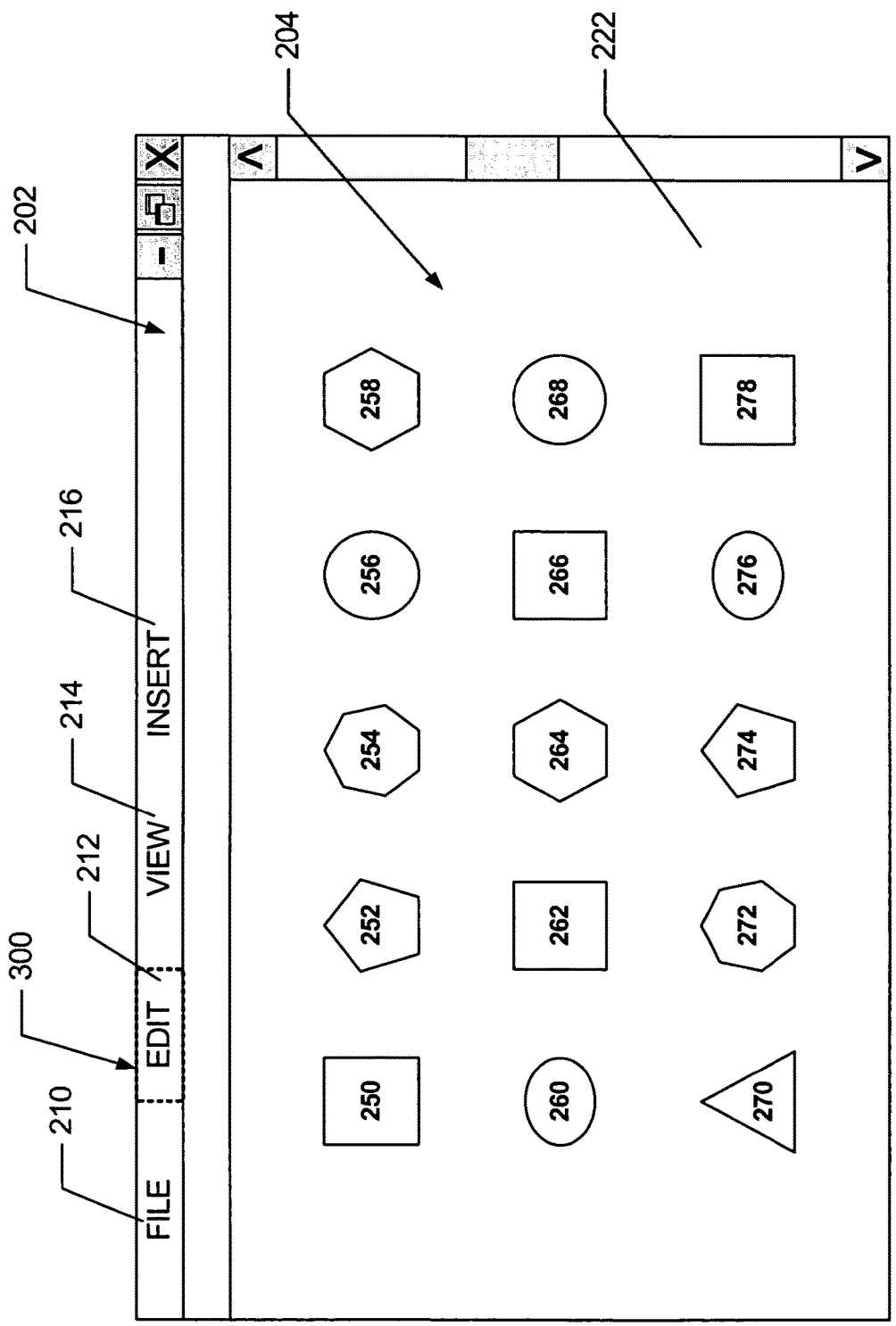
FIG. 3 illustrates one example of a GUI display screen with an animated ring around the selected 'Edit' menu title.

In the illustrated example of FIG. 3, the animated ring 300 is moved to the 'Edit' menu group 212. To open an object in the menu bar group 202, the user moves the ring 300 to the corresponding menu object and presses the select button 118. A menu, including several menu items, opens below the selected menu group 212 and the ring moves to a menu item (e.g., the topmost menu item 402) in the menu group 212.

Similarly, any one of the menu controls 218 can be selected by moving the focus to a particular menu control 218A, 218B, or 218C and pressing the select button 118. The currently focused menu control will be selected.

Figure 4:
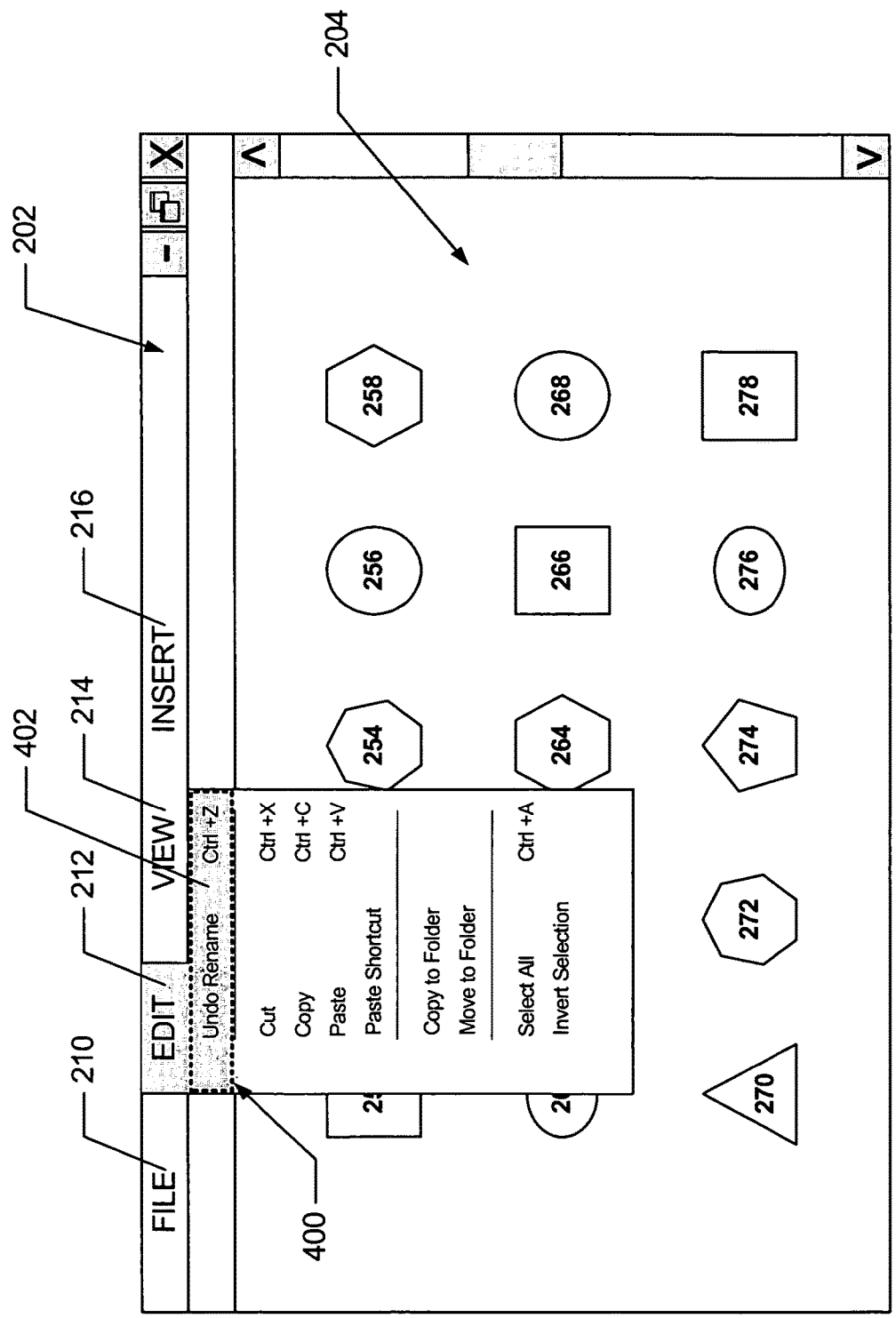
FIG. 4 illustrates another example of a GUI display screen showing menu items of the selected 'Edit' menu with animated ring around the selected first menu item.

In the illustrated example of FIG. 4, the user opens the selected 'Edit' menu group 212 and the focus (i.e., the highlighted ring) moves to the first menu item, 'Undo Rename' 402. The user selects among the menu item objects by moving the ring 400 from one menu item to another using the up and down directional buttons 110, 114 since the menu items are vertically arranged. However, in other implementations, the menus can be arranged in any direction, such as in horizontal or diagonal direction.

To execute an operation corresponding to a menu item, the user moves the ring 400 to the corresponding menu item and presses the select button 118. In response, the PDA 100 will perform the requested operation.

In one example, by pressing the left or right directional button 116 or 112 while the ring 400 is at the menu item 402 in the menu group 212, the menu group 212 is highlighted and the menu group 212 closes. Thus, in this implementation, since no sibling object of a currently focused object 402 exists in the given direction (i.e., left or right), the focus is transferred out to the parent object (i.e., the menu group 212) of the currently focused object 402.

In another implementation, by pressing the left or right directional button 116 or 112 while the focus ring 400 is at the menu item 402 in the menu group 212, the ring moves to the next menu group 210 or 214 and the menu group 212 closes. Thus, in this implementation, the focus not only moves out to the parent object (i.e., the menu group 212) but it also moves the focus to the next menu group 210 or 214 in the direction of the directional button 116 or 112. In another implementation, the focus can be transferred from a menu item object out to the parent object by pressing the down button while the focus ring is at the bottom-most menu item object.

Referring back to FIG. 3, if there is no sibling menu object in a given direction of the directional button (e.g., the ring 300 is focused on the leftmost menu 210 and the user presses the left directional button 116), the focus ring 300 is transferred out to the parent object (i.e., the menu bar group 202). By pressing the up directional button 110 while the focus ring 300 is at a menu group 210, 212, 214, 216, or 218, or the left or right directional button 116 or 112 while the focus ring 300 is at the leftmost or rightmost menu group 210 or 218C, respectively, the focus ring 300 is also transferred out to the menu bar group 202.

Figure 5:
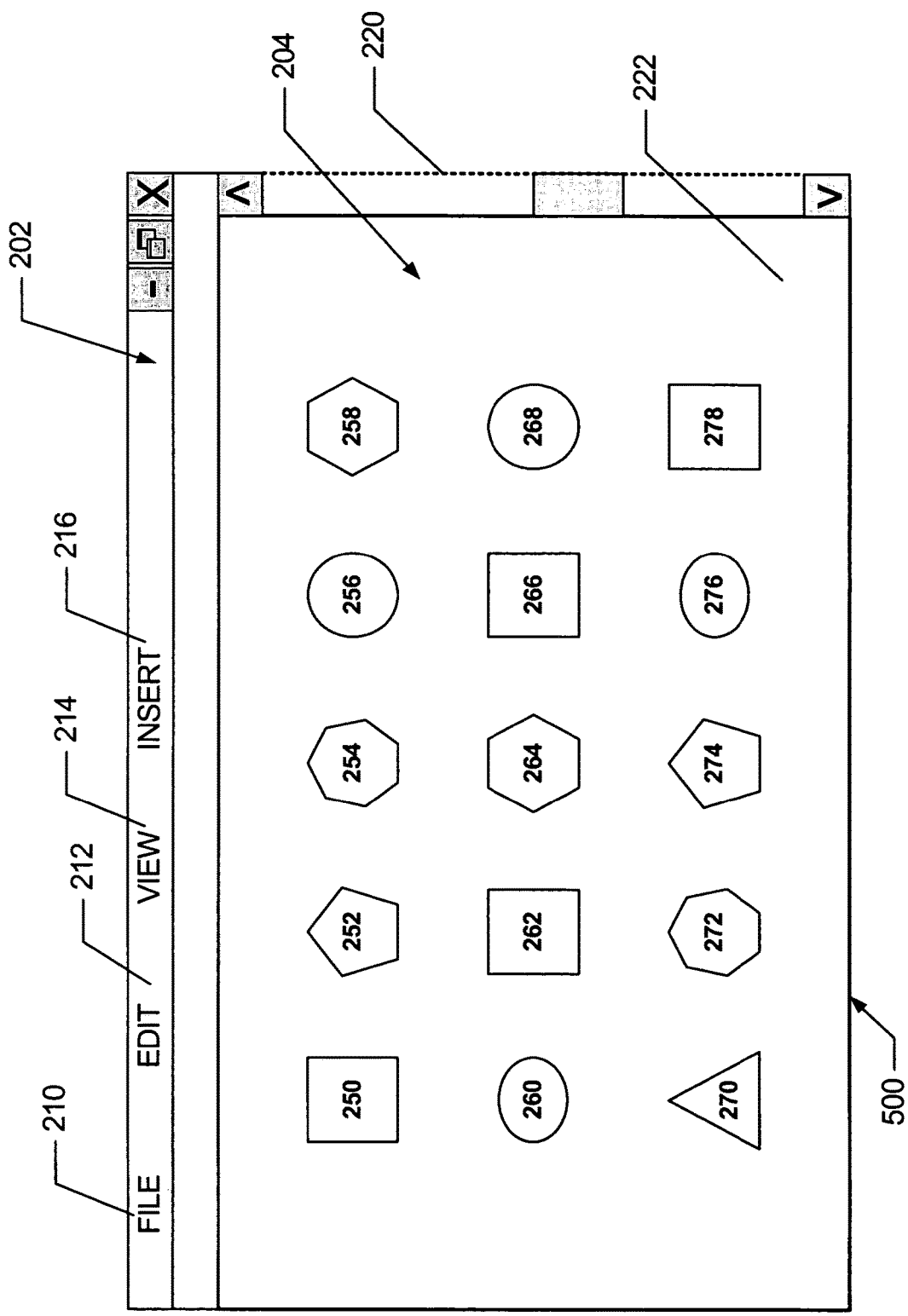
FIG. 5 illustrates operational examples of focus management system.

Referring now to FIG. 5, to enter the icon area group 222, the user moves the focus ring 500 to the icon area group 222 and presses the select button 118 while the ring 500 is at the icon area group 222. When the select button 118 is pressed, the focus is transferred into the icon objects and the focus ring highlights one of the icon objects (e.g., the icon object 250 in the upper left corner of the icon area group 222).

To access and transfer the focus to the scroll bar group 220 from the icon object 250, the user moves the focus ring to the right until the focus ring highlights the right most icon object 258 in the same row. When the right directional button 112 is pressed from the icon object 258, the focus is transferred to the parent object (i.e., the icon area group 222) since no sibling object exists to the right of the icon object 258. Now, when the right directional button 112 is pressed while the focus is at the icon area group 222, the focus transfers right to the scroll bar group 220.

Figure 6:
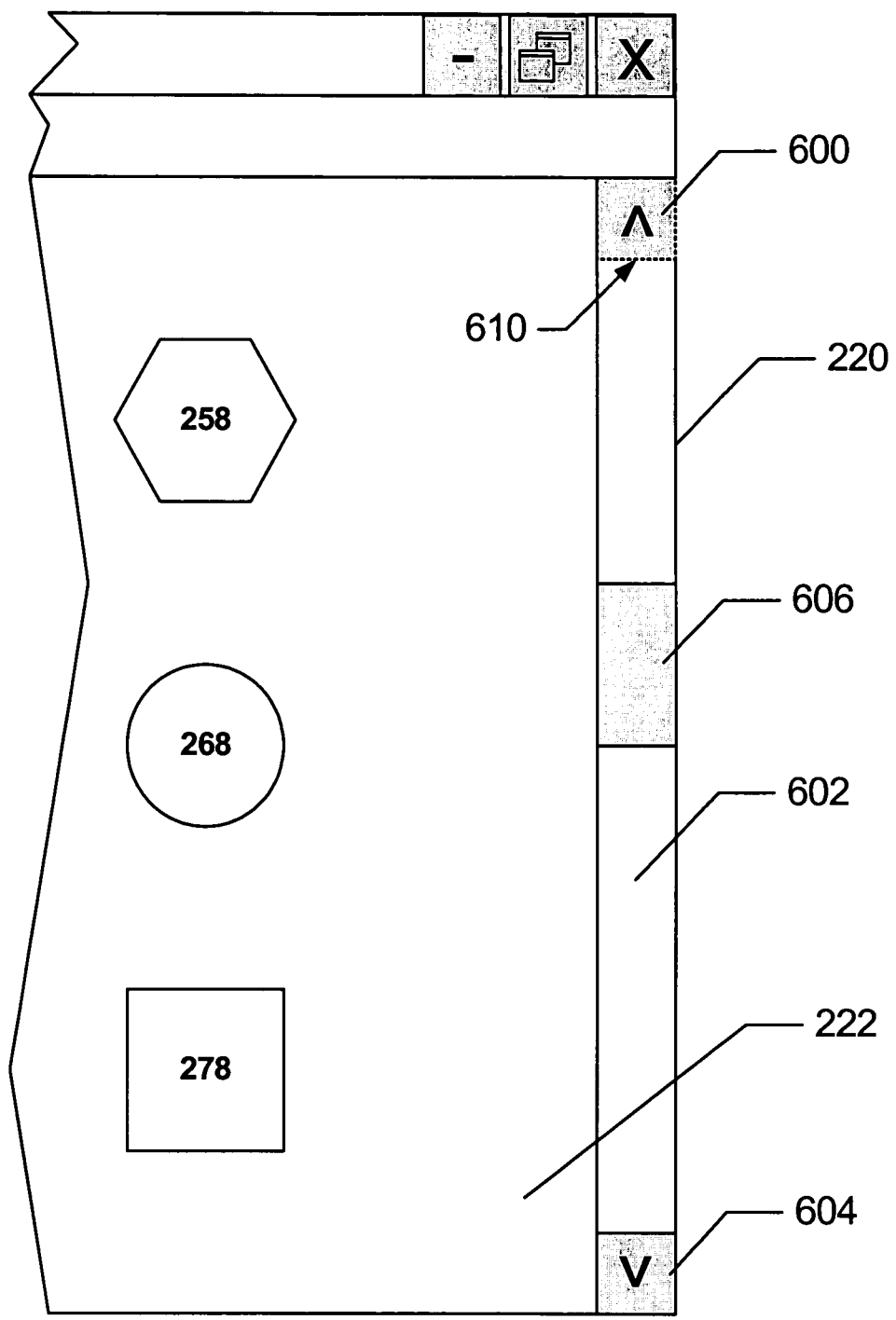
FIG. 6 illustrates a detailed view of one example of the scroll bar.

FIG. 6 illustrates a detailed view of one example of the scroll bar group 220, which includes two controls and a group: an up arrow control 600, a slider group 602, and a down arrow control 604. The up and down arrow controls 600, 604 are for scrolling the contents of the icon area group 222 in the corresponding direction. The slider group 602 includes a thumb control 606 that represents the relative vertical portion of the contents displayed in the icon area group 222 by the size and vertical position of the thumb control 606 in the slider group 602. By moving the thumb control 606 in the slider group 602, the displayed contents in the icon area group 222 can be vertically scrolled in proportion to the movement of the thumb control 606. In other implementations, the scroll bar group 220 can be configured in a horizontal direction.

In one implementation, the thumb control 606 can be moved in the general direction (e.g., the vertical direction in the illustrated example of FIG. 6) of the scroll bar group 220 using the directional buttons 110, 112, 114, 116. Thus, in the example where the scroll bar group 220 is a vertical scroll bar, the vertical directional buttons 110 and 114 can be used to move the thumb control 606. In another example, the horizontal directional buttons 112 and 116 can be used to move the thumb control in a horizontal scroll bar.

To access the controls/group 600, 602, 604, the user presses the select button 118 when the focus is at the scroll bar group 220. When the select button 118 is pressed, the focus ring 610 transfers to one of the children objects (e.g., the up arrow control 600). The user selects among the controls by moving the focus ring 610 from one object 600, 602, or 604 to another using up and down directional buttons 110, 114 because the scroll bar is vertically oriented. However, if the scroll bar is horizontally oriented, the left and right directional buttons 112, 116 would be used.

To operate one of the arrow controls, the user moves the focus ring 610 to the arrow control 600 or 604 and presses the select button 118. In response, the PDA 100 scrolls the icon objects 250, 252, 254, 256, 258, 260, 262, 264, 266, 268, 270, 272, 274, 276, 278 displayed in the icon area group 222 up or down.

To access the slider group 602, the user moves the focus ring 610 to the slider group 602 and presses the select button 118 to transfer the focus into a slider control. When the select button is pressed, the focus ring 610 moves to the child object (i.e., the thumb control 606) in the slider group 602. To move the thumb control 606 along the slider group 602 and scroll the contents of the icon area group 222, the user presses the up and down directional buttons 110, 114 while the focus is at the thumb control 606. In response, the PDA 100 moves the thumb control 606 up or down in the slider group 602 and scrolls the icons displayed in the icon area group 222 correspondingly.

Similar to the focus management of menu objects, to leave a control/group 600, 602, 604 or to leave the scroll bar group 220, the user moves the focus ring 610 "out" of that object. For example, by pressing the left or right directional button 116 or 112 while the focus ring 610 is at the thumb control 606, the focus is transferred to the parent object (i.e., the slider group 602). By pressing the left or right directional button 116 or 112 while the focus ring 610 is at one of the controls/group 600, 602, or 604, the focus is transferred to the scroll bar group 220. By pressing the up directional button 110 while the focus ring 610 is at the up arrow control 600 or pressing the down directional button 114 while the focus ring 610 is at the down arrow control 604, the focus is transferred to the scroll bar group 220.

In the above-described focus management examples, the user can move among the objects displayed in the user interface of the PDA 100 by controlling the movement of the focus ring indicator. The objects are grouped into a hierarchy of controls and/or groups so that the ring can move from one group/control to another and in and out of groups/controls. Thus, as mentioned above, a resultant hierarchical tree may include an application root and object nodes, where leaf nodes are controls and non-leaf nodes are groups.

Figure 7:
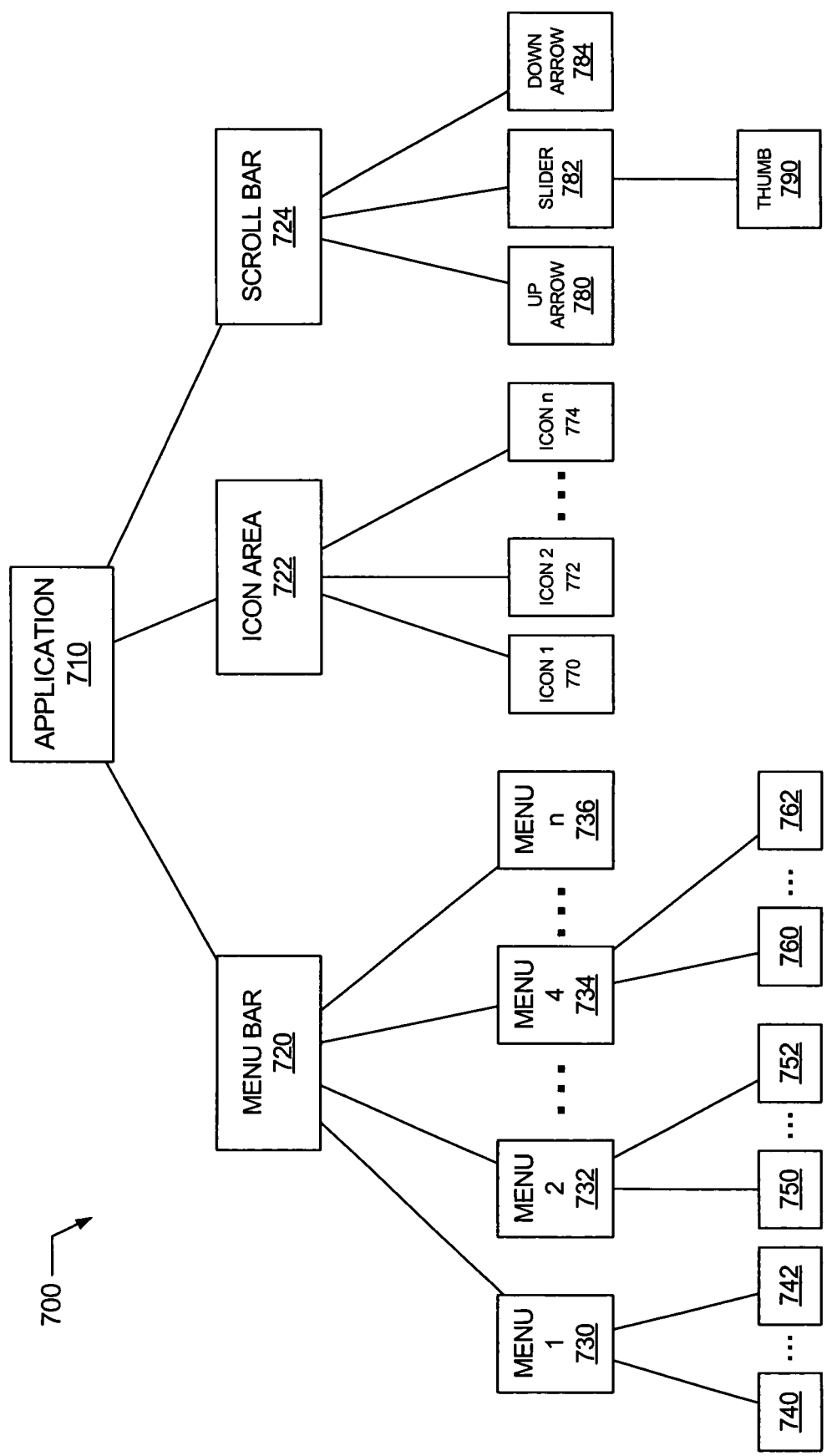
FIG. 7 illustrates one example of a general hierarchical tree showing the objects arranged in different hierarchical levels, and illustrating the management of the focus movement.

FIG. 7 illustrates one example of a general hierarchical tree 700 showing the objects arranged in different hierarchical levels, and illustrating the management of the focus movement. The numbering of the tree 700 is configured such that the second digit of the designator indicates a hierarchical level within a particular object. For example, the menu bar group 720, the icon area group 722, and the scroll bar group 724 all have the same second digit (i.e. "2") because they are all in the same hierarchical level under application 710.

In the illustrated example of FIG. 7, the application group 710 (corresponding to a window 204 in FIG. 2) includes three objects (i.e., menu bar group 720, icon area group 722, and scroll bar group 724) in its descendant chain. The menu bar group 720 includes n children objects 730, 732, 734, 736. In one example, the objects 730, 732, 734 correspond to menu groups 210, 212, 216, respectively, in FIG. 2. In another example, the object 736 corresponds to control 218A, 218B, or 218C. Each menu group 730, 732, or 734 further includes menu item objects 740/742, 750/752, or 760/762. That is, the menu group 730 includes menu item controls 740, 742; the menu group 732 includes menu item controls 750, 752; and the menu title group 734 includes menu item controls 760, 762. The object 736 includes no child object, and thus, is a menu control.

The icon area group 722 includes n children objects 770, 772, 774 corresponding to icon control 1, icon control 2, and icon control n, respectively. Any of the icon objects 250-278 of FIG. 2 can be configured as icon control 1, icon control 2, and icon control n.

The scroll bar group 724 includes three children objects 780, 782, 784 corresponding to an up arrow control 600, a slider group 602, and a down arrow control 604, respectively, in FIG. 6. The slider group 782 further includes a child object 790 corresponding to a thumb control 606 in FIG. 6.

As described above, objects displayed in the user interface include menu items, icons, buttons, and other related objects. In general, the objects can be configured as groups, which include sets of descendant objects, or as controls, which include no descendant object. The focus disposition of each object, when one of the buttons is pressed, has its own set of rules depending on the type of each object. Thus, each object is a class-based object. Some rules in the set of rules may be inherited from the parent object so that some rules of the descendant object are same as the parent object while some rules are different. For example, an object may have a set of rules that determines the focus disposition of the object depending on the location of the object in the window.

Figure 8:
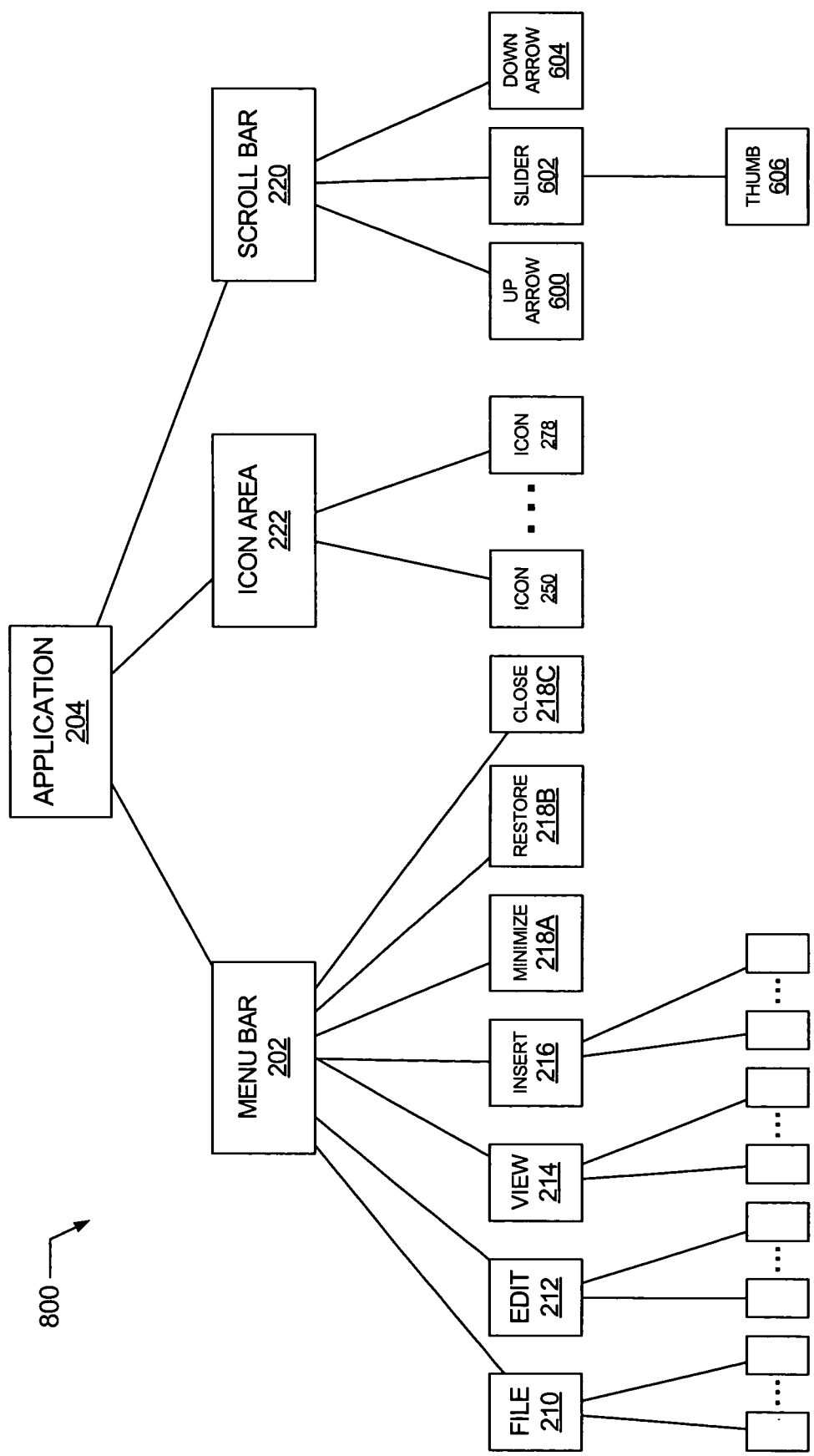
FIG. 8 illustrates a hierarchical tree corresponding to the focus management system illustrated in FIG. 2 and FIG. 6.

FIG. 8 illustrates a hierarchical tree 800 corresponding to the focus management system illustrated in FIG. 2 and FIG. 6. The top level of the tree 800 is a window application corresponding to the focus management window 204 including the focusable GUI objects. In the illustrated tree 800, the window 204 includes three children objects: a menu bar group 202, an icon area group 222, and a scroll bar group 220. Thus, the groups 202, 222, 220 are sibling objects.

The menu bar group 202 includes seven children objects: a file menu group 210, an edit menu group 212, a view menu group 214, an insert menu group 216, a minimize control 218A, a restore control 218B, and a close control 218C. Thus, objects 210, 212, 214, 216, 218 are sibling objects. Menu objects 210, 212, 214, 216 are groups since they have children objects. Menu objects 218 are controls since they have no child object.

The icon area group 222 includes a plurality of children objects 250-278. In one example shown in FIG. 2, there are 15 children objects. Some are groups and some are controls.

The scroll bar group 220 includes three children objects: an up arrow control 600, a slider group 602, and a down arrow control 604. The slider group 602 further includes a child object corresponding to a thumb control 606.

Figure 9:
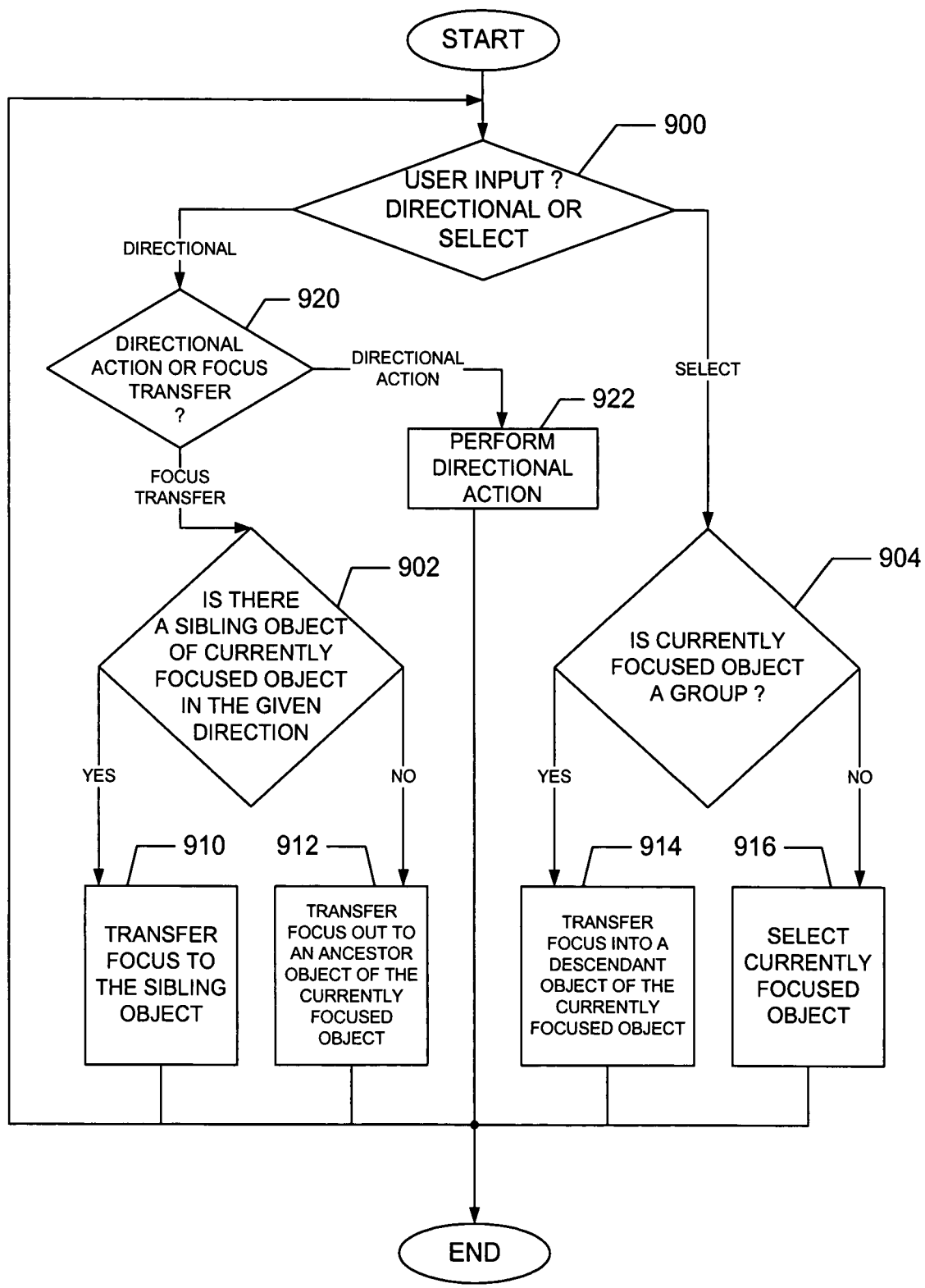
FIG. 9 illustrates a method for managing focus in a graphical user interface using a directional controller.

FIG. 9 illustrates a method for managing focus in a graphical user interface using a directional controller. In the illustrated focus management method, a user input is initially processed, at 900, to determine whether the input is a directional or selection input. A user input is a directional input when the user presses any one of the directional buttons 110, 112, 114, or 116. A user input is a selection input when the user presses the select button 118.

If the input is a directional input, then a determination is made, at 920, whether the input is a directional action for a control or a directional transfer of focus. If the currently focused object is a directional control (e.g., a control that provides directional operations, such as a slider or scroll bar), and the directional input is in a valid control direction for that control, the directional action is performed at 922. Otherwise, if the focused object is not a directional control, or if the directional input is not in a valid control direction, the input is a focus transfer and a determination is made, at 902, whether there is a sibling object of a currently focused object in the given direction of the directional input. If there is a sibling object in the given direction, then the focus is transferred, at 910, to the sibling object. Otherwise, if no sibling object exists in the give direction, then the focus is transferred out, at 912, to an ancestor object of the currently focused object. In one example, when a directional input of "up" (e.g., pressing an "up" directional arrow key or pushing up on a directional pad) is input while the currently focused object is the thumb of a vertical scroll bar, the input is handled as an up directional action, causing an upward scroll. If a directional input of "left" is received while the same thumb is the currently focused object, the input is handled as a focus transfer out to the ancestor object of the thumb (in this case, left is not a valid directional control for a vertical scroll bar).

If the input is a selection input, then a determination is made, at 904, whether the currently focused object is a group (i.e., the object has at least one descendant object). If the currently focused object is a group, then the focus is transferred, at 914, to a descendant object of the currently focused object. When there are two or more descendant objects, then the focus transfers to a particular descendant object (usually the first child object). Otherwise, if the currently focused object is not a group (i.e., a control), then the currently focused object is selected, at 916.

The above-described focus management transfers focus among the GUI objects displayed in the user interface in response to the movement direction and selection of the directional controller by moving the focus among, into, and out of the hierarchical groups of object. Therefore, the transfer of focus is accomplished by allowing the selection of GUI objects in an "intuitive manner" following the movement direction so that the focus management in a user interface can be performed using only the directional controller. The concept of the focus movement in an "intuitive manner" is described below in conjunction with the descriptions of FIGS. 1 through 9.

In one implementation of moving the focus in an "intuitive manner", the movement of the focus is described with respect to the hierarchical tree illustrated in FIG. 7. For example, if the left directional button is pressed and a sibling object in the tree is a closest object to the left of the current focus target, then the focus is transferred to that sibling object. Otherwise, if the left directional button is pressed and no sibling object in the tree lies to the left of the current focus target, then a focus is transferred out to a parent object if the parent object is focusable. Otherwise, the next focusable object up the parent chain is located, and its descendants are searched for an object that lies to the left of the current focus target. If still no target is found, then this process continues until an object is found. Otherwise, if no object has been found until the application level is reached, then that application becomes the focus target.

Any object in the tree may choose to block "focus up". For example, during the search up the parent chain, if an ancestor of the focus target is tested, and the ancestor blocks the focus up, then the search is discontinued, and the window becomes the focus target.

A determination for the "closest object to the left" can be implemented in several different ways. In one implementation, an initial search is made to find an "object to the left"

that intersects the leftward projection of the current focus target in the display. That is, an object that intersects the top or bottom edge of the current focus target's bounding box when the box is extended to the left. If no object can be found, an "object closest to the left" is selected. The "object closest to the left" is determined by comparing the distances from the center of the current object to the centers of the objects to the left of the current object, and selecting an object that provides the smallest distance. Note that this means that "which object is the 'object to the left' of the current focus target" can change if the current object is moved up or down in the GUI display screen.

The up, right, and down buttons can be configured similarly to the configuration of the left button as explained above by modifying the direction test appropriately.

The select button transfers focus to the first focusable descendant in the tree. Concerning text-field-specific behaviors, the select button transfers focus internally and allows text editing when the text field is normally focused, while the select button transfers internal focus back to the text field and prevents text editing when the text field is already internally focused. Concerning button-specific behaviors, the select button emulates the user clicking on the button. Concerning horizontal-slider-specific behaviors, the select button transfers focus to the thumb control when the slider is normally focused, while the select button transfers focus back to the slider when the thumb control of the slider is already internally focused. The left button nudges the thumb a little bit to the left if the thumb control has the focus. Otherwise, if the thumb control does not have the focus, the left button performs default left operation. The right button nudges the thumb a little bit to the right if the thumb control has the focus. Otherwise, if the thumb control does not have the focus, the right button performs default right operation.

In various implementations described above, focus management includes visually animating focus targets, such as changing color and simulating dots moving around the focus target. In a further implementation, the focus target animation may include morphing one object into another or allowing the path of animation to follow the directional change of the focus target when the focus target changes during animation. In another implementation, shadowing movement of a ring in a direction that does not have a corresponding element at the same level causes the ring to move up a layer in the hierarchy and stay in the same item, or to move up a layer and to the next item in the hierarchy in that direction.

In further implementations, the focus management can be configured to include several different options for the focus movement. In one option, the focus occurs on a select button click. In another option, a "latent" focus allows the focus to be present and capable of becoming a full focus by being "selected" but the focus can initially stay less obvious, such as being shadowed or partially visible. Thus, the latent focus option allows selection or entry into a full focus. The latent focus can be used for the default button of a dialog, where the focus highlight is drawn in a more subtle fashion. In another option, no animation is rendered when transitioning from a latent focus target to a full focus target. In yet another option, a focus is retained until animation causes visible focus to reach next object. In a further option, a "block" focus blocks focus down/in or up/out relative to navigation.

In a further implementation, the focus management of a text container can be configured so that initially the focus is maintained at a top level with no editing allowed. However, once the text container is entered, editing is allowed.

Various implementations of the invention are realized in electronic hardware, computer software, or combinations of these technologies. Most implementations include one or more computer programs executed by a programmable computer. For example, in one implementation, a focus management system includes one or more computers executing software implementing the management of focus discussed above. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Although various illustrative implementations of the present invention have been described, one of ordinary skill in the art will see that additional implementations are also possible and within the scope of the present invention. For example, although the above implementations use directional buttons and a select button to perform focus management of GUI objects, the focus management can be performed using any type of input device including, but not limited to, eight-way joystick, analog joystick, two-dimensional control, jog dial, mouse, keyboard, speech-driven directions, network commands, and virtual-reality (VR) input devices.

Accordingly, the present invention is not limited to only those implementations described above.

What is claimed is:

1. A non-transitory computer storage medium storing a computer program to manage focus in a graphical user interface by receiving a directional input and a selection input, the computer program comprising executable instructions that cause a computer to:

determine whether the input is directional or selection;

determine whether there is a sibling object of a currently focused object in a given direction of the input when the input is directional and a directional action is valid;

transfer the focus to the sibling object when there is a sibling object in the given direction;

transfer the focus to a thumb control of a parent object of the currently focused object when there is no sibling object in the given direction, wherein the thumb control moves in the given direction of the input and a display of contents moves in proportion to the movement of the thumb control;

determine whether the currently focused object is a group having at least one descendant object;

transfer the focus to a first available descendant object within the at least one descendant object of the currently focused object when the currently focused object is a group and the input is selection, wherein each descendant object of the group inherits a set of rules from the parent object, the set of rules determining a focus disposition of each descendant object; and select the currently focused object when the currently focused object is a non-group object including a control object and the input is selection.

2. The non-transitory computer storage medium of claim 1, wherein executable instructions that cause a computer to transfer the focus to the sibling object of the currently focused object includes executable instructions that cause a computer to:

determine whether the sibling object is a focusable object; and transfer the focus to a next focusable sibling object in the given direction when the sibling object is a non-focusable object.

3. The non-transitory computer storage medium of claim 1, wherein executable instructions that cause a computer to transfer the focus to a first available descendant object within the at least one descendant object of the currently focused object includes executable instructions that cause a computer to:

determine whether the first available descendant object is a focusable object; and transfer the focus to a next focusable descendant object within the at least one descendant object and then down a child chain when the first available descendant object is a non-focusable object.

4. An apparatus for managing focus in a graphical user interface using a directional controller that allows a directional input and a selection input, the apparatus comprising:

means for determining whether the input is directional or selection;

means for determining whether there is a sibling object of a currently focused object in a given direction of the input when the input is directional and a directional action is valid;

means for transferring the focus to the sibling object when there is a sibling object in the given direction;

means for transferring the focus to a thumb control of a parent object of the currently focused object when there is no sibling object in the given direction, wherein the thumb control moves in the given direction of the input and a display of contents moves in proportion to the movement of the thumb control;

means for determining whether the currently focused object is a group having at least one descendant object;

means for transferring the focus to a first available descendant object within the at least one descendant object of the currently focused object when the currently focused object is a group and the input is selection, wherein each descendant object of the group inherits a set of rules from the parent object, the set of rules determining a focus disposition of each descendant object; and means for selecting the currently focused object when the currently focused object is a non-group object including a control object and the input is selection.

5. The non-transitory computer storage medium of claim 1, wherein executable instructions that cause a computer to transfer the focus to a first available descendant object within the at least one descendant object of the currently focused object includes executable instructions that cause a computer to transfer the focus to a first accessible descendant object within the at least one descendant object in the group.

6. The non-transitory computer storage medium of claim 1, further comprising executable instructions that cause a computer to:

determine whether the input is a directional action for a control or a directional transfer of focus when the first determining indicates a directional input;

perform the directional action when the currently focused object is a directional control, and the directional input is in a valid control direction for that control; and perform said second determining when the focused object is a non-directional control, or when the directional input is in an invalid control direction.

7. The apparatus of claim 4, wherein means for transferring the focus to the sibling object of the currently focused object comprises:

means for determining whether the sibling object is a focusable object; and means for transferring the focus to a next focusable sibling object in the given direction when the sibling object is a non-focusable object.

8. The apparatus of claim 4, wherein means for transferring the focus to a first available descendant object within the at least one descendant object of the currently focused object comprises:

means for determining whether the first available descendant object is a focusable object; and means for transferring the focus to a next focusable descendant object within the at least one descendant object and then down a child chain when the first available descendant object is a non-focusable object.

9. The apparatus of claim 4, wherein means for transferring the focus to a first available descendant object within the at least one descendant object of the currently focused object comprises means for transferring the focus to a first accessible descendant object within the at least one descendant object in the group.

10. The apparatus of claim 4, further comprising:

means for determining whether the input is a directional action for a control or a directional transfer of focus when the first determining indicates a directional input;

means for performing the directional action when the currently focused object is a directional control, and the directional input is in a valid control direction for that control; and means for performing said second determining when the focused object is a non-directional control, or when the directional input is in an invalid control direction.

* * * * *